United States Patent [19]

Bishop

[11] 4,072,020
[45] Feb. 7, 1978

[54] SOIL TREATMENT METHOD

[75] Inventor: Richard T. Bishop, Durban, South Africa

[73] Assignee: Revertex (South Africa) (Proprietary) Limited, Jacobs, South Africa

[21] Appl. No.: 665,566

[22] Filed: Mar. 10, 1976

[51] Int. Cl.$^2$ .............................................. E04D 3/12
[52] U.S. Cl. .............................. 61/36 C; 106/287 SS; 404/76
[58] Field of Search .............................. 61/36 C, 1 R; 106/287 SS; 166/295; 404/75, 76; 260/DIG. 14; 427/136, 138

[56] References Cited

U.S. PATENT DOCUMENTS

| 2,745,815 | 5/1956 | Mussel | 260/37 |
| 3,077,054 | 2/1963 | Niemeijer | 47/9 |
| 3,677,014 | 7/1972 | Stout et al. | 61/36 C |
| 3,690,107 | 9/1972 | Dolfing et al. | 61/36 C |

FOREIGN PATENT DOCUMENTS

| 4,511,088 | 4/1970 | Japan | 61/36 C |
| 1,373,020 | 11/1974 | United Kingdom | 61/36 C |
| 906,470 | 6/1960 | United Kingdom | 61/36 C |

Primary Examiner—Paul R. Gilliam
Assistant Examiner—Alex Grosz
Attorney, Agent, or Firm—Young & Thompson

[57] ABSTRACT

The invention relates to a method of aggregating sands to an appreciable depth so that they can be used, inter alia, for runways, roadways and the like, the method comprising applying a polymer emulsion to a body of sand in a large volume of water containing a stabilizer which ensures distribution of the polymer throughout a substantial depth and prevention of migration of the polymer as the water evaporates, thereby forming bonds between adjacent sand particles, and allowing the sand to dry.

1 Claim, No Drawings

SOIL TREATMENT METHOD

This invention relates to a method of aggregating sand and sandy soils. In the specification which follows the term "sand" is intended to include sandy soils.

All methods known to the Applicant involving the treatment of sands with polymeric compositions result in only a surface film being formed. Special effects have been obtained by the use of two-component polymer systems or in situ freezing of the water in the sand, but these methods are very expensive.

It is an object of the present invention to provide a method of aggregating sand in appreciable depth using a very dilute one-component composition.

It is a further object of the invention to provide a method of aggregating sand which is very easy to apply.

According to the invention a method of aggregating sands to an appreciable depth includes the step of applying a polymer emulsion in a large volume of water to a body of sand, the composition of the polymer emulsion being such that the polymer is distributed through a substantial depth and does not migrate upwards as the water evaporates, thereby forming bonds between adjacent sand particles.

In this specification the term "polymer emulsion" means either the product resulting from emulsion polymerisation or an emulsion of a polymer.

In the preferred form of the invention the polymer emulsion is stabilised with a colloid stabiliser, such as gums, cellulose, polyvinylalcohol, and others normal in polymer technology. The surfactant-type of stabilisers so far tested have not proved suitable. However it may be possible to prepare a stabiliser of this type which could be useful in the present invention.

The amount of polymer required to effect satisfactory aggregation is surprisingly small and the ratio of dry polymer to sand can be less than 3:100. In fact, in many applications it can be as little as 0,2:100.

Sand may be aggregated in depths in excess of 3 cm, the upper limit of depth being governed by many factors, including particle size of the sand, concentration of polymer, amount of water used and the like. The volume of water used to disperse the polymer emulsion is preferably greater than 5 liters per square meter area of the sand. Either fresh or saline water may be used.

According further to the invention the polymer emulsion and the water are simply applied to the surface of a sand area, but it will be appreciated that the polymer emulsion/water may be mixed with a quantity of sand and the mixture applied as a layer to a surface On evaporation of the water from the sand a consolidated load-bearing crust is formed which can be used for roads, runways and the like. In fact, the crust is in some ways superior to aggregates prepared from cement, which frequently crack and break under varying climatic conditions and usage because of its inflexibility. By virtue of the small quantities of dry polymer used, the treatment of sands according to the invention can be even less expensive than aggregation with cement.

In my co-pending U.S. application Ser. No. 638,166 Issue filed Dec. 5, 1975 there was described a method of treating sand or soil by applying a composition including a polymer in an amount to provide from about 0.01 to about 0.5 parts of polymer to 100 parts of sand so that the particles are rendered non-wetting and free flowing. It is a further object of the present invention to combine the two desirous properties. Thus, according further to the invention sand is rendered water-repellant and then treated with mechanical mixing by the method according to the present invention.

As mentioned above, the term "sand" includes sandy soil and it has been found that the invention works best in soils having less than 10 percent by weight of clay having regard to the total inorganic fraction.

Most polymer types may be used to carry out the present invention — for example polyvinylacetate homopolymers, vinyl acetate-acrylic copolymers, acrylic-acrylic copolymers and the like are all effective with the correct stabiliser system, which is easily established by simple trial and error. However, the following examples are given as a guide to the performing of the invention.

EXAMPLE 1

A 100 square meter area of very steep gold mine dump sand was sprayed with a diluted emulsion of externally-plasticised polyvinylacetate homopolymer emulsion.

The polyvinylacetate emulsion at 58% solids content and a surface tension of 49 dynes per cm was diluted 30 times with water and then sprayed onto the sand at a rate of 10 liters per square meter. The metering was achieved by a venturi system at the exit end of the hose and mains water was used.

The sand was allowed to air dry and within 7 days a crust about 7 centimeters thick had formed. This crust easily bore the weight of a heavy man and only with great difficulty could it be penetrated.

EXAMPLE 2

A flat area of reclaimed marine sand was sprayed with an externally plasticised polyvinylacetate homopolymer emulsion. Saline water was pumped onto an area of reclaimed marine sand at a rate of 150 – 300 liters per minute. The 58% solids emulsion at a surface tension of 50 dynes per cm was bled into the intake side of a centrifugal pump to give a final emulsion solids of 1 – 3%. The liquid was applied at approximately 25 liters per square meter. After 2 weeks air drying a crust some 12 centimeters thick had formed which supported the weight of a commercial vehicle driven across it.

EXAMPLE 3

An area of reclaimed marine sand was sprayed with fresh water containing 1% solids of a colloid stabilised polyvinylacetate homopolymer externally plasticised with a low level of dibutylphthalate. The 1% solids emulsion was applied at the rate of 20 liters per square meter. This was immediately followed by the same emulsion but diluted less to give a higher solids content and applied at a rate of 5 liters per square meter. The whole area was lightly compacted and allowed to air dry. An effective aggregation to a depth of 15 cms was obtained.

After 7 days' drying a vehicle of approximately 3,000 kg was driven over the area without any ill effects to the aggregate. Because of the higher binder content in the wearing surface, little damage was caused by the tire movement.

EXAMPLE 4

In order to compare the efficacy of some colloid stabilizers with those of surfactant stabilizers tested to date, emulsions containing completely or predominantly vinyl acetate as monomer were polymerised using different stabilisers. The resulting emulsions were diluted with water to give a solids content of 1.0%. Marine sand (180 g) was slurried with 34 g of this diluted emulsion and then poured into a mould and compressed slightly. The sand was dried at 50° C and the force necessary to break the resulting aggregates was measured on a Richards Rupture Tester.

Results were as follows:

| Stabiliser Systems | Mean Modulus of Rupture (millibars) |
| --- | --- |
| Surfactant (Dowfax 2A1) (Trade Mark) | 0 |
| Cellulose - (Natrosol) - Trade Mark (Hercules) | 499 |
| Polyvinyl alcohol | 1598 |
| Gums (gum acacia, gum arabic) | 3103 |

The colloid stabilised emulsions which include the cellulose, acrylics and gums have sand aggregating properties whereas the surfactant stabilised types so far tested have none.

EXAMPLE 5

Emulsions containing as monomers vinyl acetate only, vinyl acetate-2 ethylhexylacrylate and methylmethacrylate-2 ethylhexylacrylate were manufactured using the same colloid stabiliser. The methylmethacrylate-2 ethylhexylacrylate emulsion was also produced again but replacing the colloid stabiliser with a surfactant stabiliser. The resulting emulsions were diluted to 1.0% solids and 34 g of this was used to slurry 180 g of beach sand. This slurry was poured into moulds, dried at 50° C and when dry the rupture strengths of the aggregated sand was measured on the Richards Rupture Tester.

Results were as follows:

| Polymer Type | Mean Modulus of Rupture (millibars) |
| --- | --- |
| Vinyl acetate only | 3734 |
| Vinyl acetate-2 ethylhexylacrylate | 1893 |
| Methylmethacrylate-2 ethylhexylacrylate (colloid) | 1699 |
| Methylmethacrylate-2 ethylhexylacrylate (surfactant-(Dowfax 2A1)) (Trade Mark) | 0 |

Irrespective of the monomers the colloid stabilised emulsions resulted in good sand aggregation.

EXAMPLE 6

In order to reduce the effect of water on the strength of sand aggregated by the techniques described in this patent, use was made of the water repellency effect covered by our my above-identified co-pending application.

In accordance with the prior application, marine sand of particle size less than 710 micron was made water repellant. This loose sand (180 g) was mixed with some difficulty with (35.5 g) a 1% solids emulsion of a gum stabilised polyvinylacetate (PVAc)/homopolymer externally plasticised with dibutylphthalate. The sand polymer slurry was poured into a stainless steel mould and dried at 55° C for 17 hours. As a control ordinary marine sand was mixed with the same amount of the PVAc emulsion.

When dry the consolidated sand samples were subjected to the Richards Rupture test and their water uptakes measured after 17 hours submersion.

The results were as follows:

| Polymer Type | Modulus of Rupture (millibars) | Water Uptake in % (17 hours submersion) |
| --- | --- | --- |
| PVAc homopolymer (ordinary sand) | 3633 | 21.0 |
| PVAc homopolymer (pretreated sand) | 3989 | 6.4 |

The pretreated sand has considerably increased the waterproofing properties of the PVAc-sand aggregate.

EXAMPLE 7

By the correct balance of emulsion stabilisers it was possible in one polymer to achieve both bond strength and water repellency (as per my above-identified prior patent application).

Marine sand of particle size less than 710 micron was mixed with a vinylacetate-vinylester of versatic acid copolymer diluted to 1% solids in the ratio of 180 g to 35.5 g. This emulsion was made using a blend of colloid and surfactant stabilisers. The resulting slurry was cast into a mould and dried at 55° C for 17 hours.

As controls, a purely colloidal stabilised emulsion and separately a purely surfactant stabilised emulsion were included using the same grading of marine sand and same weight to weight ratios.

Results were as follows:

| Stabiliser Type | Modulus of Rupture (millibars) | Water Uptake in % (17 hours submersion) |
| --- | --- | --- |
| Colloid | 3522 | 24.1 |
| Surfactant | 0 | 6.6 |
| Colloid-Surfactant blend | 529 | 12.2 |

The colloid stabilised system gave good strength but poor water repellency. In contrast the surfactant stabilised system had no sand aggregating properties but excellent water repellency. The emulsion using a blend of colloid and surfactant as stabilisers imparted intermediate aggregating and water repellency properties.

I claim:

1. A method of aggregating sands to a depth of at least 3 cm to form a consolidated load-bearing crust, comprising flooding the surface of the sand with more than about 5 liters per square meter of sand, with water containing an effective amount less than about 3% by dry weight of a water-insoluble polymer emulsion selected from the group consisting of polyvinylacetate, vinylacetate-acrylic copolymer and acrylic-acrylic copolymer, which polymer has been polymerized with a colloid stabilizer as the main stabilizer in the polymer chain, said colloid stabilizer being selected from the group consisting of cellulose, polyvinyl alcohol, gum acacia and gum arabic, said amount being effective to aggregate the sand to said depth, the composition of the polymer emulsion being such that the polymer is distributed throughout the desired depth and does not migrate as the water evaporates, thereby forming bonds between adjacent sand particles.

* * * * *